(12) United States Patent
Billon et al.

(10) Patent No.: US 11,331,813 B2
(45) Date of Patent: May 17, 2022

(54) VACUUM CHAMBER WITH EASIER ASSEMBLY FOR GRIPPER

(71) Applicant: COVAL, Montelier (FR)

(72) Inventors: Julien Billon, Larnage (FR); Pierre Milhau, Boug de Peage (FR); Michel Cecchin, Montelier (FR)

(73) Assignee: COVAL, Montelier (FR)

(*) Notice: Subject to any disclaimer, the term of this patent is extended or adjusted under 35 U.S.C. 154(b) by 166 days.

(21) Appl. No.: 16/634,803

(22) PCT Filed: Jul. 30, 2018

(86) PCT No.: PCT/EP2018/070635
§ 371 (c)(1),
(2) Date: Jan. 28, 2020

(87) PCT Pub. No.: WO2019/020838
PCT Pub. Date: Jan. 31, 2019

(65) Prior Publication Data
US 2020/0269443 A1 Aug. 27, 2020

(30) Foreign Application Priority Data
Jul. 28, 2017 (FR) ...................................... 17 57256

(51) Int. Cl.
*B25J 15/06* (2006.01)
(52) U.S. Cl.
CPC ................................ *B25J 15/0625* (2013.01)

(58) Field of Classification Search
CPC .... B25J 15/0625; B25J 15/0616; B65G 47/91
See application file for complete search history.

(56) References Cited

U.S. PATENT DOCUMENTS

| | | |
|---|---|---|
| 2,798,757 A | 7/1957 | Jackson |
| 3,230,001 A | 1/1966 | Hirt |
| 4,712,818 A | 12/1987 | Borgman et al. |
| H1373 H | 11/1994 | Durham et al. |
| 7,000,964 B1* | 2/2006 | Porras .................. B25J 15/0616 294/186 |
| 7,017,961 B1 | 3/2006 | Parnell et al. |
| 7,648,182 B2* | 1/2010 | Salimkhan ........... B25J 15/0616 294/65 |

(Continued)

FOREIGN PATENT DOCUMENTS

DE 4128659 A1 3/1992
JP 2002137183 A 5/2002

*Primary Examiner* — Stephen A Vu
(74) *Attorney, Agent, or Firm* — Muncy, Geissler, Olds & Lowe, P.C.

(57) ABSTRACT

A vacuum chamber for a gripper including at least one fastener plate and at least one pneumatic accessory fastened in a perforation in the fastener plate. The pneumatic accessory is held in the perforation by an elastically deformable tubular interface including an external groove in which the periphery of the perforation is received so as to provide sealing between the plate and the interface, the interface defining a channel extending between a first end of the interface extending inside the chamber and a second end extending outside the chamber, at least a portion of the pneumatic accessory being inserted in the channel of the interface.

16 Claims, 7 Drawing Sheets

(56) References Cited

U.S. PATENT DOCUMENTS

| | | | | |
|---|---|---|---|---|
| 7,950,708 | B2 * | 5/2011 | Parnell | B25J 15/0616 |
| | | | | 294/2 |
| 8,684,434 | B2 * | 4/2014 | Lomerson, Jr | B25J 15/0633 |
| | | | | 294/186 |
| 9,669,554 | B2 * | 6/2017 | Eisele | B65G 47/91 |
| 2009/0273199 | A1 * | 11/2009 | Joguet | B65G 47/91 |
| | | | | 294/188 |

* cited by examiner

VACUUM CHAMBER WITH EASIER ASSEMBLY FOR GRIPPER

The present invention relates to pneumatic technology, and more particularly to devices for gripping parts by suction.

STATE OF THE ART

A suction device generally comprises a chamber associated with a suction source in order to create a vacuum inside the chamber. The chamber generally includes a plate (also referred to as a soleplate) that is provided with suction cups. Each suction cup comprises a metal body having a first end segment fastened in a perforation in the plate and a second end segment extending outside the plate and carrying a deformable suction cup. The first end of such a metal body is conventionally provided with a collar and with a thread enabling the plate to be clamped between the collar and a nut, without forgetting a sealing gasket that prevents a leak appearing between the body and the plate.

That type of assembly is found to be not very practical, and it complicates both manufacture and maintenance of the chamber, since both assembly and disassembly of a suction cup require the chamber to be disassembled in part.

OBJECT OF THE INVENTION

An object of the invention is to simplify assembly of accessories associated with a vacuum chamber.

BRIEF SUMMARY OF THE INVENTION

To this end, the invention provides a vacuum chamber for a gripper, the vacuum chamber including at least one fastener plate and at least one pneumatic accessory fastened in a perforation in the fastener plate. The pneumatic accessory is held in the perforation by an elastically deformable tubular interface including an external groove in which the periphery of the perforation is received so as to provide sealing between the plate and the interface, the interface defining a channel extending between a first end of the interface extending inside the chamber and a second end extending outside the chamber, at least a portion of the pneumatic accessory being inserted in the channel of the interface.

Thus, the interface serves both to retain the pneumatic accessory on the plate of the chamber and also to provide sealing between the plate of the chamber and the interface. The accessory is thus made easier to assemble and to disassemble.

Other characteristics and advantages of the invention appear on reading the following description of particular, nonlimiting embodiments of the invention.

BRIEF DESCRIPTION OF THE FIGURES

Reference is made to the accompanying drawings, in which.

DETAILED DESCRIPTION OF THE INVENTION

With reference to the figures, the vacuum chamber 1 of the invention is for a gripper and it defines a leaktight enclosure including at least one fastener plate 2 for fastening at least one pneumatic accessory given overall reference 10. The chamber may be formed by assembling together a frame forming the sides of the chamber and two parallel plates, including the plate 2, which plates form the main faces of the chamber. The chamber may equally well be formed by using a channel section member having a central web and two flanges, with the plate 2 being fastened to the free edges of the flanges so as to extend parallel to the central web and thereby form a tubular duct having its ends closed by stoppers. The plate 2 is provided with perforations 3, each enabling a pneumatic accessory 10 to be fastened by means of a tubular interface, given overall reference 50, which interface is made of an elastically deformable material, such as an elastomer.

Figure 1:
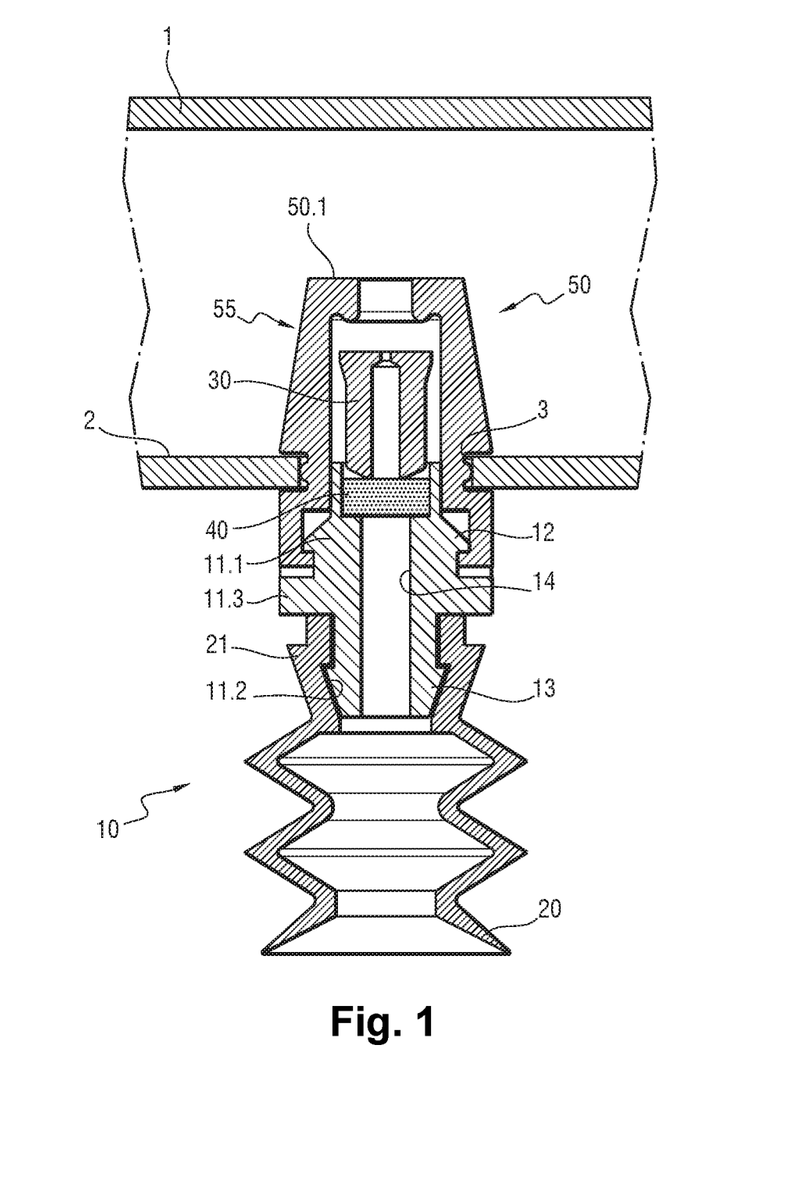
FIG. 1 is a fragmentary diagrammatic section view of a chamber of the invention.
Figure 2:
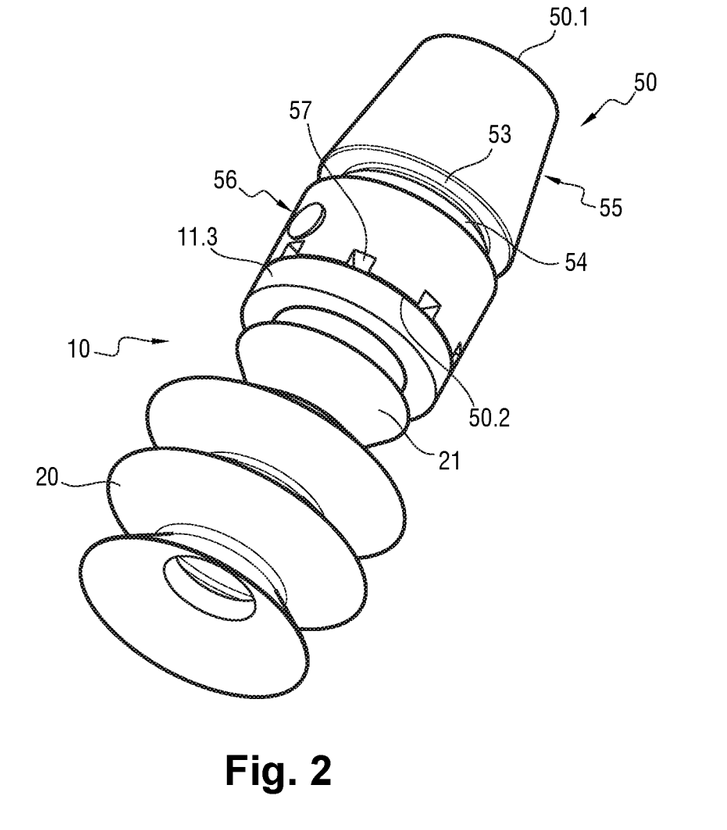
FIG. 2 is a perspective view of an accessory of the invention.

The pneumatic accessory 10 shown in FIGS. 1 and 2 is a gripper accessory, commonly referred to as a "suction cup".

The pneumatic accessory 10 comprises a tubular body 11, generally made of metal, having a first segment 11.1 for connecting to the tubular interface 50, and a second segment 11.2 for connecting to flexible bellows 20 forming the suction cup proper. The first segment 11.1 is separated from the second segment 11.2 by an external collar 11.3 and it includes an external tooth 12 in the shape of a Christmas tree (or "barb") with its sloping portion extending beside the free end of the first segment 11.1. The first segment 11.1 has a free end portion that extends beyond the external tooth 12. The second segment 11.2 includes one or more external teeth 13 of Christmas tree shape with the sloping portion(s) extending beside the free end of the second segment 11.2. The tubular body 11 defines an internal channel 14.

The second end segment 11.2 is engaged by force in a sleeve 21 having one end secured to the flexible bellows 20 and another end in abutment against the collar 11.3. In this example, the flexible bellows 20 and the sleeve 21 comprise a single piece of an elastically deformable material such as an elastomer.

The first end segment 11.1 is engaged by force in the tubular interface 50 that serves to fasten the pneumatic accessory 10 to the plate 2.

Figure 3:
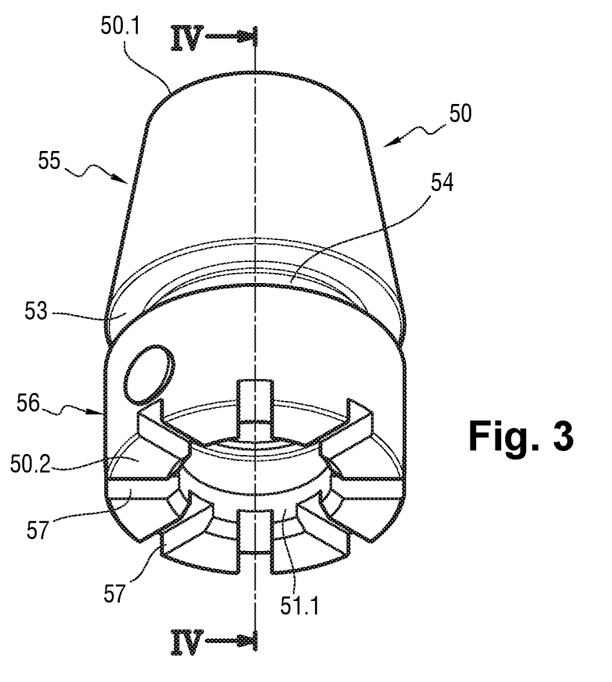
FIG. 3 is a perspective view of a fastener interface in a first embodiment of the invention.
Figure 4:
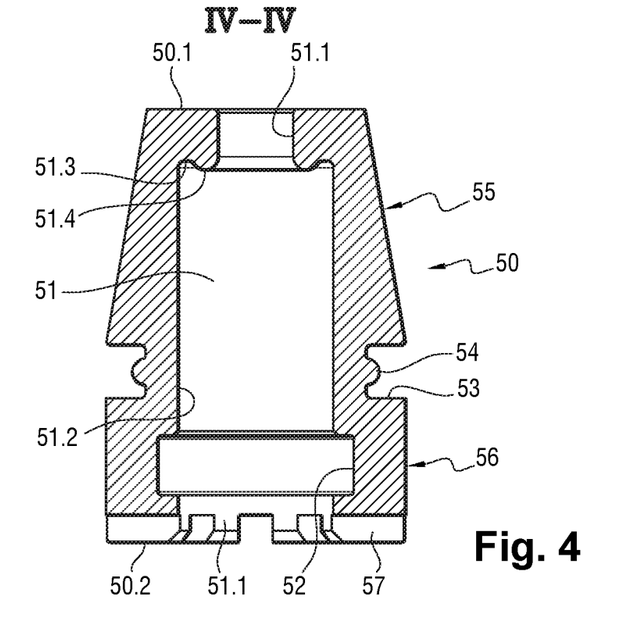
FIG. 4 is a view of this interface in section on plane IV of FIG. 3.

The tubular interface 50 defines a channel 51 extending between a first end 50.1 of the tubular interface 50 that projects into the chamber 1, and a second end 50.2 that projects away from the plate 2 to the outside of the chamber.

The channel 51 includes a segment 51.1 opening out in the first end 50.1 and a segment 51.2 opening out in the second end 50.2. The segment 51.1 is smaller in diameter than the segment 51.2 and it is connected thereto via a radial shoulder 51.3. The radial shoulder 51.3 includes an annular bead 51.4 projecting axially towards the second end 50.2. The segment 51.2 has a diameter that is substantially equal to or slightly less than the diameter of the terminal portion of the first end segment 11.1. The tubular interface 50 further includes an internal groove 52 formed in the segment 51.2 in the vicinity of the second end 50.2 in order to receive the external tooth 12.

The tubular interface 50 is provided externally with an external groove 53 arranged to receive the periphery of the perforation 3 so as to provide sealing between the plate 1 and the tubular interface 50. The external groove 53 has a projecting bottom with an annular bead 54 running therealong. In this example, the annular bead 54 presents a half-round cross-section.

The tubular interface 50 has both a frustoconical surface 55 extending between the first end 50.1 and the external groove 53 in such a manner that the smaller section of the frustoconical surface is adjacent to the first end 50.1, and also a cylindrical surface 56 extending between the second end 50.2 and the external groove 53.

The second envelope 50.2 of the tubular interface 50 is provided with slots 57 extending radially from an inner circumference of the tubular interface 50 to an outer circumference of the tubular interface 50.

After the chamber 1 has been assembled, each interface 50 is installed in one of the perforations 3 by engaging the first end 50.1 of the tubular interface 50 in the perforation 3 until the periphery of the perforation 3 is received in the external groove 53. It should be observed that the diameter of the annular bead 54 is greater than the diameter of the perforation 3 in such a manner that the annular bead 54 is pressed hard against the periphery of the perforation 3 and provides sealing between the tubular interface 50 and the plate 2. It can also be observed that the external groove 53 is of width that is slightly greater than the thickness of the plate 2 in order to facilitate putting the tubular interface 50 into place in the perforation 3.

Thereafter, the accessory 10 is put into place by inserting the first end segment 11.1 of the tubular body 11 into the second segment 51.2 of the tubular interface 50 until the external collar 11.3 comes into abutment against the second end 50.2 of the tubular interface 50. The annular tooth 12 is then received in the internal groove 52 extending in the tubular interface 50 so that as a result of becoming engaged in the internal groove 52, the annular tooth 12 has a shoulder facing a flank of the internal groove 52 that serves to retain the body 11 in the tubular interface 50. It should also be observed that the free end portion of the first end segment 11.1 then extends at least in part in register with the perforation 3 and opposes any radial deformation of the tubular interface 50 of the kind that would allow the periphery of the perforation 3 to disengage from the external groove 53. Preferably, the first end segment 11.1 of the body 11 is clamped in the tubular interface 50. The end segment 11.2 carrying the bellows 20 forming the suction cup projects outside the chamber 1 and the tubular interface 50.

It can thus be understood that the tubular interface 50 serves to fasten the accessory 10 to the plate 2 merely by engaging the first end segment 11.1 of the tubular body 2 by force in the tubular interface 50. The external collar 11.3 bears against the second end 50.2 of the tubular interface 50, thereby providing a backing surface against which the sleeve 21 secured to the bellows 20 forming the suction cup can bear.

In the embodiment of FIG. 1, the accessory 10 is associated with two other pneumatic accessories 30 and 40.

The pneumatic accessory 40 is a filter that is fastened to the free end portion of the first end segment 11.1.

The pneumatic accessory 30 is a leak valve that is inserted in the segment 51.2 before the first end segment 11.1 of the tubular body 2 is itself inserted so as to be received between the pneumatic accessory 40 that is secured to the first end segment 11.1 and the radial shoulder 51.3 that is situated in the proximity of the first end of the tubular interface 50. The pneumatic accessory 30 is mounted to be movable in the segment 51.2 between a position bearing against the annular bead 51.4 forming a valve seat and a position spaced apart from the annular bead 51.4 (shown in FIG. 1).

It should be observed that the pneumatic accessories 30 and 40 are received entirely within the channel 51, whereas the pneumatic accessory 10 is received in part only in the channel 51 of the tubular interface 50.

In the following description of embodiment variants shown in FIGS. 5 to 7, elements that are identical or analogous to those described above are given numerical references that are identical.

Figure 5:
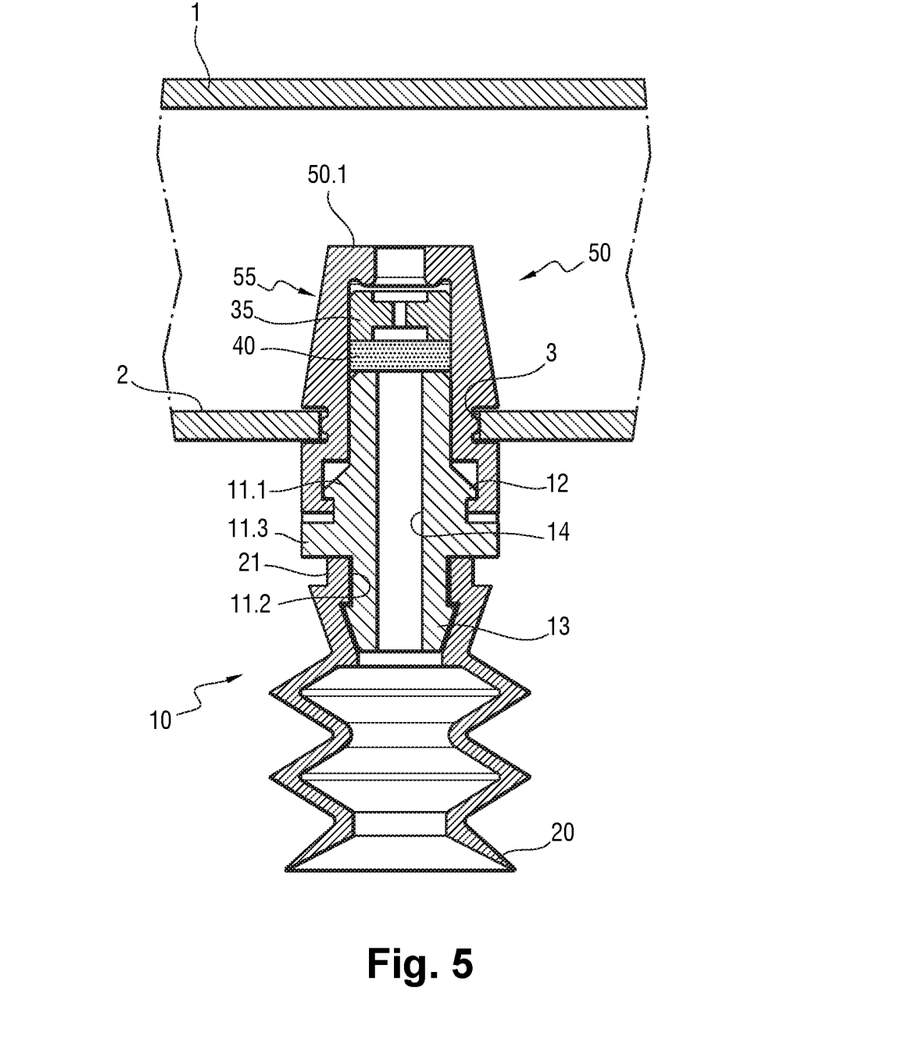
FIG. 5 is a view analogous to FIG. 1 showing a chamber in a first embodiment variant.
Figure 6:
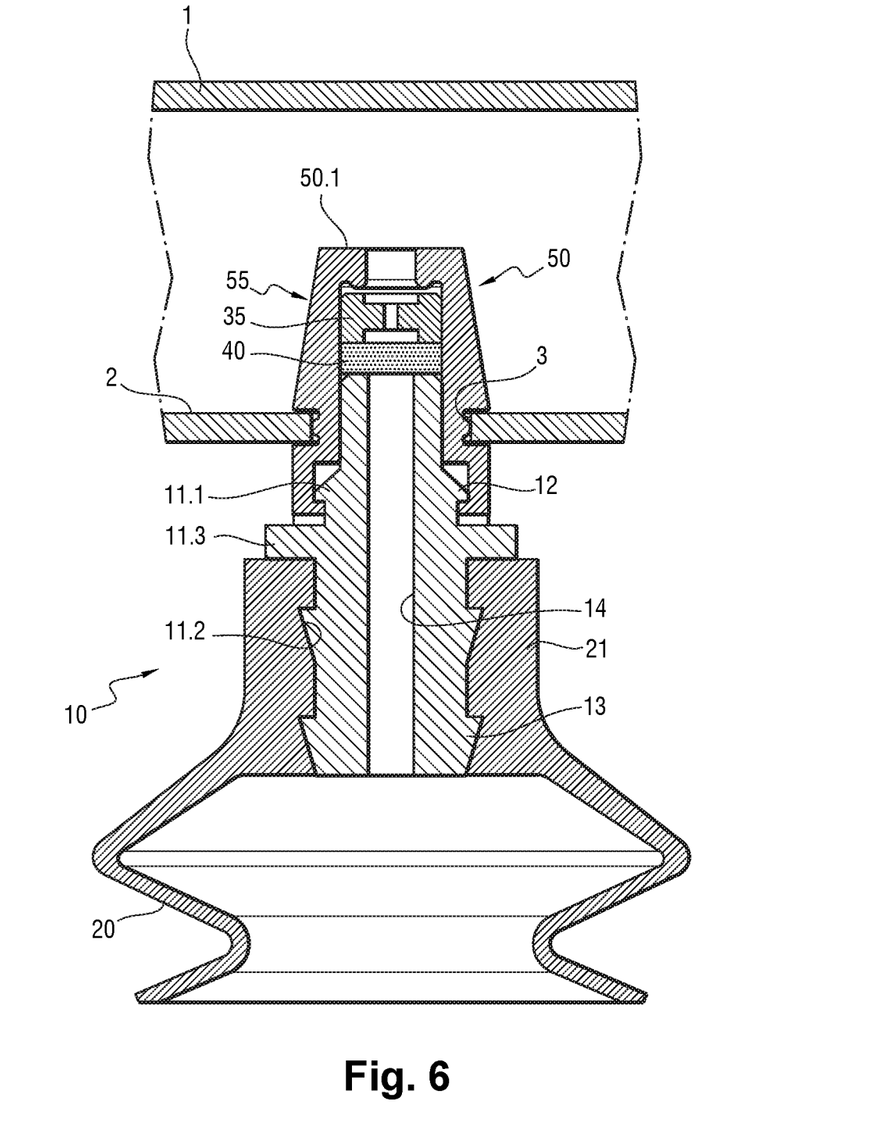
FIG. 6 is a view analogous to FIG. 1 showing a chamber in a second embodiment variant.
Figure 7:
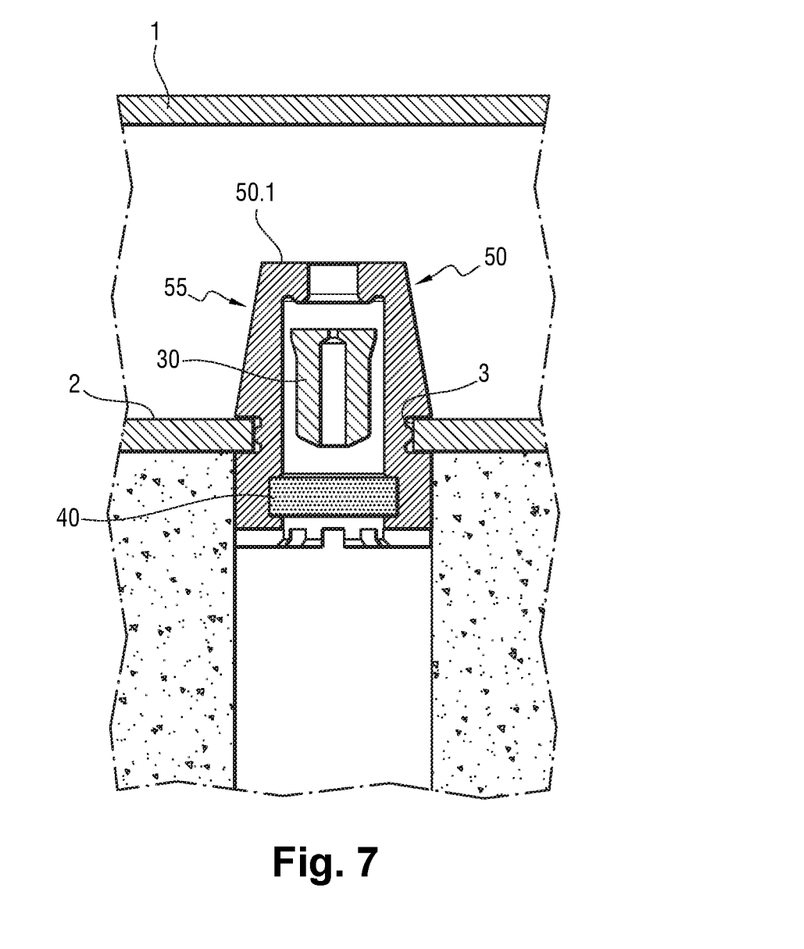
FIG. 7 is a view analogous to FIG. 1 showing a chamber in a second embodiment of the invention.

The tubular interface 50 in FIGS. 5 to 7 is identical to that described above.

If the variant of FIG. 5, the first end segment 11.1 of the tubular body 2 is longer than that shown in FIG. 1 so as to enable the pneumatic accessory 40 and a pneumatic accessory 35 to be pressed against the annular bead 51.3.

As above, the pneumatic accessory 40 is a filter, however it is detached from the free end portion of the first end segment 11.1.

The pneumatic accessory 35 is a block provided with a duct extending along the central axis of the tubular interface 50 and defining a calibrated leak. The pneumatic accessory 35 is inserted in the segment 51.2 before the pneumatic accessory 40 and then the first end segment 11.1 of the tubular body 2 is inserted therein so as to be received between the pneumatic accessory 40 and the radial shoulder 51.3.

The variant of FIG. 6 is analogous in all points to the variant of FIG. 5 except that the external collar 11.3 and the second end segment 11.2 of the tubular body are of larger diameter in order to support a bellows 20 and a sleeve 21 that are themselves of larger diameter.

In the second embodiment, as shown in FIG. 7, which is adapted in particular to chambers 1 in which the plate 2 is covered in a backing layer made of a sealing foam of elastically deformable material that is perforated in register with the perforations 3, the tubular interface 50 is used to fasten both of the pneumatic accessories 30 and 40.

As above, the pneumatic accessory 40 is a filter, however it is received in the internal groove 52 of the interface 50.

The pneumatic accessory 30 is a leak valve that is inserted in the segment 51.2 before the pneumatic accessory 40 is inserted therein so as to be received between the pneumatic accessory 40 and the radial shoulder 51.3.

The pneumatic accessory 30 is mounted to be movable in the segment 51.2 between a position bearing against the annular bead 51.4 forming a valve seat and a position spaced apart from the annular bead 51.4 (shown in FIG. 7).

The slots 57 enable a leak to be maintained even if the part for transporting becomes pressed against the end 50.2 of the tubular interface 50.

Figure 8:
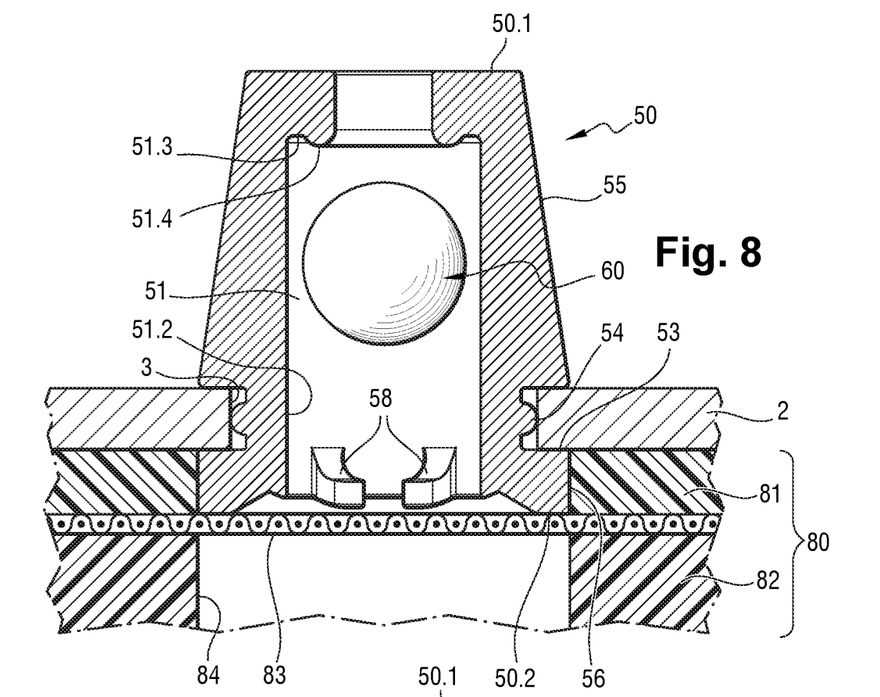
FIGS. 8 and 9 are views analogous to FIG. 1 showing a chamber in two variants of the second embodiment of the invention.
Figure 9:
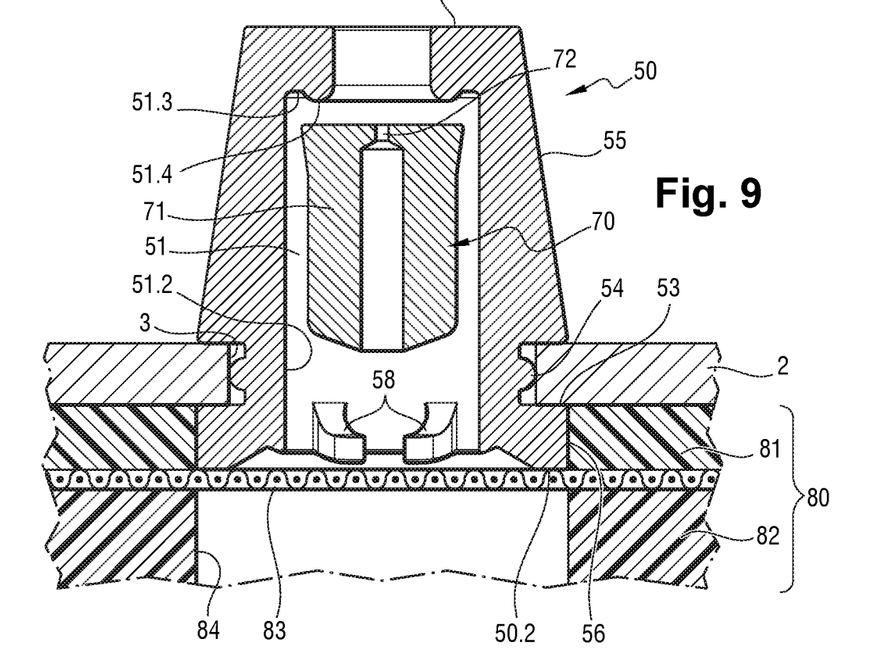

In the variance of FIGS. 8 and 9, the tubular interface 50 comprises, as above:
    an external groove 53 arranged to receive the periphery of the perforations 3 in such a manner as to provide sealing between the plate 1 and the tubular interface 50. The external groove 53 has a projecting bottom with an annular bead 54 running therealong. In this example, the annular bead 54 presents a half-round cross-section;
    a frustoconical external surface 55 extending between the first end 50.1 and the external groove 53 in such a manner that the smaller section of the frustoconical surface is adjacent to the first end 50.1;

a cylindrical external surface 56 extending between the second end 50.2 and the external groove 53; and a channel 51 extending between a first end 50.1 of the tubular interface 50 that projects into the chamber 1, and a second end 50.2 that projects from the plate 2 to the outside of the chamber.

The channel 51 includes a segment 51.1 opening out in the first end 50.1 and a segment 51.2 opening out in the second end 50.2. The second 51.1 is smaller in diameter than the segment 51.2 and it is connected thereto via a radial shoulder 51.3. The radial shoulder 51.3 includes an annular bead 51.4 projecting axially towards the second end 50.2. The segment 51.2 has a diameter greater than the diameter of the accessory 60, 70 that it is to receive.

Furthermore, the tubular interface 50 includes at least one portion in relief 58 projecting radially into the channel 51 in the vicinity of the end 50.2 in order to retain the pneumatic accessory. In this example, the tubular interface 50 has a plurality of portions in relief, specifically five of them, in the form of lugs arranged substantially in a common plane extending across the channel 51.

In FIG. 8, the pneumatic accessory 60 is in the form of a ball mounted in the segment 51.2. The ball is engaged in the end of the channel 51 that opens out in the end 50.2: the portions in relief 58 are deformed elastically in order to allow the ball to pass through, and then they return to their non-deformed state in order to retain the ball in the segment 51.2. It can be understood that the force that an operative needs to exert in order to deform the portions in relief 58 is greater than the force that the ball can exert on its own under normal operating conditions for the chamber.

The ball is movable between a position in which it bears against the portions in relief 58, in which position air can flow in the channel 51 and around the ball, and a position bearing against the bead 51.4 that forms a valve seat, in which position air cannot flow in the channel 51.

In FIG. 9, the pneumatic accessory 70 is a block 71 provided with a duct 72 extending along the central axis of the tubular interface 50 and defining a calibrated leak. Like the pneumatic accessory 60, the block is engaged in the end of the channel 51 that opens out in the end 50.2: the portions in relief 58 are deformed elastically in order to allow the block 71 to pass through, and then they return to their non-deformed state in order to retain the block 71 in the segment 51.2. It can be understood that the force that an operative needs to exert in order to deform the portions in relief 58 is greater than the force that the block 71 can exert on its own under normal operating conditions for the chamber.

The block 71 is movable between a position bearing against the portions in relief 58, in which position air can flow in the channel 51 and around the block 71, and a position bearing against the bead 51.4 that forms a valve seat, in which position air can flow in the channel 51, but only at the rate allowed by the smallest through section in the duct 72.

In FIG. 9, it should be observed that the fastener plate 2 is covered in a backing layer 80 made of elastically deformable material that includes holes 84 in register with the perforations 3 in the fastener plate 2. In this example, the elastically deformable material is an elastomer foam.

More particularly in this example, the backing layer 80 comprises a first sublayer 81 of height greater than or equal to the height of the tubular interface 50 projecting outside the fastener plate 2, and a second sublayer 82. The sublayers 81 and 82 are perforated in register with the perforations 3. Between the sublayers 81 and 82, there extends a filter layer 83 having portions that extend in register with the perforations in order to perform a filter function. In this example, the filter layer 83 is made of a woven material.

Such a sandwich layer 80 could equally well be used with a chamber as shown in FIG. 8.

Naturally, the invention is not limited to the embodiments described and covers any variant coming within the ambit of the invention as defined by the claims.

In particular, other pneumatic accessories or components could be used with the tubular interface 50, and it is also possible to use a suction cup without having recourse to any other pneumatic accessories as described herein.

Although the flanks of the external groove 50 are described as being mutually parallel, they could diverge from each other, being spaced apart at the bottom of the external groove 53 by less than the thickness of the plate 2, and being spaced apart remote from the bottom by more than the thickness of the plate.

The presence of the bead 54 is optional, and the bottom of the external groove 53 could be flat.

The tubular interface could be of a shape that is different from that described: the frustoconical outside surface is advantageous but not essential, the number of slots 57 could be smaller, or the slots 57 could be omitted completely . . . .

The valve could be of any shape that enables it to perform its function, and for example it could be cylindrical in shape.

The number and the shape of the portions in relief 58 could be modified.

The invention claimed is:

1. A vacuum chamber for a gripper, the vacuum chamber and including at least one fastener plate and at least one pneumatic accessory fastened in a perforation in the fastener plate, wherein the pneumatic accessory is held in the perforation by an elastically deformable tubular interface including an external groove in which the periphery of the perforation is received so as to provide sealing between the plate and the interface, the interface defining a channel extending between a first end of the interface extending inside the chamber and a second end extending outside the chamber, at least a portion of the pneumatic accessory being inserted in the channel of the interface-, wherein the pneumatic accessory is received substantially in full in the interface and the interface includes at least one portion in relief projecting radially into the channel in order to retain the pneumatic accessory therein.

2. The vacuum chamber according to claim 1, wherein the pneumatic accessory is a valve.

3. The vacuum chamber according to claim 2, wherein the valve is arranged to define a leakage duct.

4. The vacuum chamber according to claim 1, wherein the interface has a plurality of portions in relief in the form of lugs arranged substantially in a common plane extending across the channel.

5. A vacuum chamber for a gripper, the vacuum chamber and including at least one fastener plate and at least one pneumatic accessory fastened in a perforation in the fastener plate, wherein the pneumatic accessory is held in the perforation by an elastically deformable tubular interface including an external groove in which the periphery of the perforation is received so as to provide sealing between the plate and the interface, the interface defining a channel extending between a first end of the interface extending inside the chamber and a second end extending outside the chamber, at least a portion of the pneumatic accessory being inserted in the channel of the interface, wherein the pneumatic accessory is received substantially in full in the interface and the plate is covered in a backing layer of elastically deformable foam including holes in register with the perforations in the fastener plate.

6. The vacuum chamber according to claim 5, wherein the backing layer comprises a first sublayer and a second sublayer between which there extends a filter layer having portions in register with the perforations.

7. A vacuum chamber for a gripper, the vacuum chamber and including at least one fastener plate and at least one pneumatic accessory fastened in a perforation in the fastener plate, wherein the pneumatic accessory is held in the perforation by an elastically deformable tubular interface including an external groove in which the periphery of the perforation is received so as to provide sealing between the plate and the interface, the interface defining a channel extending between a first end of the interface extending inside the chamber and a second end extending outside the chamber, at least a portion of the pneumatic accessory being inserted in the channel of the interface, wherein the interface includes a frustoconical end segment beside the first end.

8. A vacuum chamber for a gripper, the vacuum chamber and including at least one fastener plate and at least one pneumatic accessory fastened in a perforation in the fastener plate, wherein the pneumatic accessory is held in the perforation by an elastically deformable tubular interface including an external groove in which the periphery of the perforation is received so as to provide sealing between the plate and the interface, the interface defining a channel extending between a first end of the interface extending inside the chamber and a second end extending outside the chamber, at least a portion of the pneumatic accessory being inserted in the channel of the interface, wherein the groove has a projecting bottom with an annular bead running therealong.

9. A vacuum chamber for a gripper, the vacuum chamber and including at least one fastener plate and at least one pneumatic accessory fastened in a perforation in the fastener plate, wherein the pneumatic accessory is held in the perforation by an elastically deformable tubular interface including an external groove in which the periphery of the perforation is received so as to provide sealing between the plate and the interface, the interface defining a channel extending between a first end of the interface extending inside the chamber and a second end extending outside the chamber, at least a portion of the pneumatic accessory being inserted in the channel of the interface, wherein the pneumatic accessory comprises a tubular body retained in the perforation by the elastically deformable tubular interface, the body being inserted in the interface via the second end of the channel extending outside the chamber.

10. The vacuum chamber according to claim 9, wherein, near the first end, the channel includes a radial shoulder for abutment against the body.

11. The vacuum chamber according to claim 10, wherein the radial shoulder includes an annular bead projecting axially towards the second end.

12. The vacuum chamber according to claim 9, wherein the tubular body has a portion extending level with the groove.

13. The vacuum chamber according to claim 9, wherein the body is clamped in the interface and has an end segment that projects outside the chamber and that carries a suction cup.

14. The vacuum chamber according to claim 13, wherein the body includes an external collar to bear against the second end of the interface and to have the suction cup bear thereagainst.

15. A vacuum chamber for a gripper, the vacuum chamber and including at least one fastener plate and at least one pneumatic accessory fastened in a perforation in the fastener plate, wherein the pneumatic accessory is held in the perforation by an elastically deformable tubular interface including an external groove in which the periphery of the perforation is received so as to provide sealing between the plate and the interface, the interface defining a channel extending between a first end of the interface extending inside the chamber and a second end extending outside the chamber, at least a portion of the pneumatic accessory being inserted in the channel of the interface, wherein the second end of the interface is provided with at least one slot extending from an inner circumference of the interface to an outer circumference of the interface.

16. The vacuum chamber according to claim 15, wherein the slot extends radially.

* * * * *